(12) United States Patent
Doyle et al.

(10) Patent No.: US 8,078,117 B2
(45) Date of Patent: *Dec. 13, 2011

(54) ASSET APPARENCY METHOD AND APPARATUS

(75) Inventors: Thomas F. Doyle, San Diego, CA (US); Dudley K. Fetzer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/685,778

(22) Filed: Jan. 12, 2010

(65) Prior Publication Data

US 2010/0156603 A1    Jun. 24, 2010

Related U.S. Application Data

(63) Continuation of application No. 10/782,594, filed on Feb. 18, 2004.

(51) Int. Cl.
*H04B 1/00* (2006.01)
*H04B 7/00* (2006.01)

(52) U.S. Cl. ......... 455/69; 455/70; 455/456.1; 455/457; 340/539.13; 340/572.1; 340/989

(58) Field of Classification Search ............... 455/69, 455/70, 456.1, 457; 340/539.13, 572.1, 989
See application file for complete search history.

(56) References Cited

U.S. PATENT DOCUMENTS

| | | | |
|---|---|---|---|
| 4,688,244 A | 8/1987 | Hannon et al. | |
| 4,750,197 A | 6/1988 | Denekamp et al. | |
| 5,539,810 A | 7/1996 | Kennedy, III et al. | |
| 5,544,225 A | 8/1996 | Kennedy, III et al. | |
| 5,835,377 A | 11/1998 | Bush | |
| 5,917,433 A | 6/1999 | Keillor et al. | |
| 5,999,091 A | 12/1999 | Wortham | |
| 6,265,988 B1 | 7/2001 | LeMense et al. | |
| 6,577,921 B1 | 6/2003 | Carson | |
| 6,606,557 B2 | 8/2003 | Kotzin | |
| 6,687,609 B2 | 2/2004 | Hsiao et al. | |

(Continued)

FOREIGN PATENT DOCUMENTS

DE    19704210    8/1998

(Continued)

OTHER PUBLICATIONS

Office Action dated Jan. 25, 2011. U.S. Appl. No. 11/858,876.

(Continued)

*Primary Examiner* — Tuan H Nguyen
(74) *Attorney, Agent, or Firm* — Gerald P. Joyce, III (57) ABSTRACT

A method and apparatus making an asset apparent. The method and apparatus may be configured to obtain an asset apparency request to locate an asset, wherein the asset apparency request includes an identification code corresponding to the asset, to generate an asset apparency message, wherein the asset apparency message includes an identification code corresponding to the user, the identification code corresponding to the asset, and one or more instructions to trigger the asset to perform one or more functionalities to make the asset apparent, and to transmit, to a central processing facility wherein the asset apparency message is processed by the central processing facility by: determining a unique identifying value for the asset from the identification codes corresponding to the user and the asset, and transmitting the one or more instructions to trigger the asset to perform one or more functionalities to make the asset apparent.

43 Claims, 5 Drawing Sheets

U.S. PATENT DOCUMENTS

| | | |
|---|---|---|
| 7,339,469 B2 | 3/2008 | Braun |
| 2004/0082296 A1 | 4/2004 | Twitchell, Jr. |
| 2005/0145688 A1 | 7/2005 | Milenkovic et al. |
| 2005/0156716 A1 | 7/2005 | Flick |
| 2005/0283613 A1 | 12/2005 | Carpentier et al. |
| 2007/0288163 A1 | 12/2007 | Meyer et al. |
| 2008/0143593 A1 | 6/2008 | Graziano et al. |

FOREIGN PATENT DOCUMENTS

| | | |
|---|---|---|
| WO | WO2007097766 | 8/2007 |

OTHER PUBLICATIONS

Office Action dated May 27, 2010. U.S. Appl. No. 11/858,876.

Office Action dated Nov. 9, 2010. U.S. Appl. No. 11/858,876.

ASSET APPARENCY METHOD AND APPARATUS

CLAIM OF PRIORITY UNDER 35 U.S.C. §120

The present Application for Patent is a Continuation and claims priority to patent application Ser. No. 10/782,594 entitled "Asset Apparency Method and Apparatus" filed Feb. 18, 2004, and assigned to the assignee hereof and hereby expressly incorporated by reference herein.

BACKGROUND

I. Field

The embodiments described herein pertain generally to the field of asset management and more particularly to methods and apparatus for having an asset make itself apparent to one attempting to locate the asset.

II. Description of the Related Art

Asset management is an important part of many businesses today. Assets may include, for example, earth moving equipment, tractor trailers, construction equipment, railroad train cars and engines, cargo containers, and rental equipment of all shapes and sizes. Asset management is particularly important in instances where assets are moved in the typical course of business or in cases where assets themselves are mobile. For example, in the equipment rental industry, equipment is usually rented to individuals or companies for use away from a rental equipment yard.

Part of a good asset management system should include the ability to locate an asset among a group of similar assets or to locate an asset within a given geographic area. Such a capability would make it easy for workers to locate, for example, a particular backhoe among a group of similar backhoes for maintenance purposes. Or a foreman on a jobsite may need to locate a particular earth mover because it needs to be returned to a rental company.

What is needed, therefore, is a method and apparatus for locating assets quickly and easily.

SUMMARY

The requirements for locating an asset quickly and easily are realized by various embodiments of the invention described herein. In one embodiment, an apparatus for making an asset apparent to an individual comprises a receiver for receiving a request from a wireless communication system for having the asset make itself apparent and providing the request to a processor. The processor receives the request and generates a command to make the asset apparent. Finally, the apparatus comprises an interface for providing the command to a device on the asset, the device for making the asset apparent to the individual.

In another embodiment, a wireless communication device for making an asset apparent to an individual comprises an input for allowing the individual to enter an identification code corresponding to the asset, a processor for receiving the input and generating a request to make the asset apparent, the request including the identification code. Finally, the apparatus comprises a transmitter for transmitting the request to the asset.

In another embodiment, an apparatus for making an asset apparent to an individual comprises a receiver for receiving a request directly from a wireless communication device for having the asset make itself apparent and providing the request to a processor. The processor receives the request, determines how to make the asset apparent; and generates a command to make the asset apparent. Finally, the apparatus comprises an interface for providing the command to a device on the asset, the device for making the asset apparent to the individual.

In yet another embodiment, a computer program product tangibly embodying a non-transitory machine-readable storage medium with instructions executable by a digital processing apparatus is used to perform a method for making an asset apparent, the method comprising operations of receiving an identification code corresponding to said asset, generating a request to make the asset apparent, and transmitting the request directly to the asset corresponding to said identification code.

In yet still another embodiment, a computer program product tangibly embodying a non-transitory machine-readable storage medium with instructions executable by a digital processing apparatus is used to perform a method for making an asset apparent, the method comprising operations of receiving an identification code corresponding to said asset, generating a request to make said asset apparent, and transmitting the request to the asset corresponding to the identification code over a wireless communication network.

In yet another embodiment, a computer program product tangibly embodying a non-transitory machine-readable storage medium with instructions executable by a digital processing apparatus is used to perform a method for making an asset apparent, the method comprising operations of receiving a request from a wireless communication system for having the asset make itself apparent, generating a command to make the asset apparent, and providing the command to a device on the asset, the device for making the asset apparent to the individual.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes methods and apparatus for making as asset apparent to an individual. The embodiments described herein can be used in a number of industries, such as the equipment rental industry, the construction industry, the shipping and transportation industry, the warehouse industry, and others. It should also be understood that the embodiments described herein can be used to locate a wide variety of assets, including vehicles, trailers, construction equipment, cargo containers, and so on.

Figure 1:
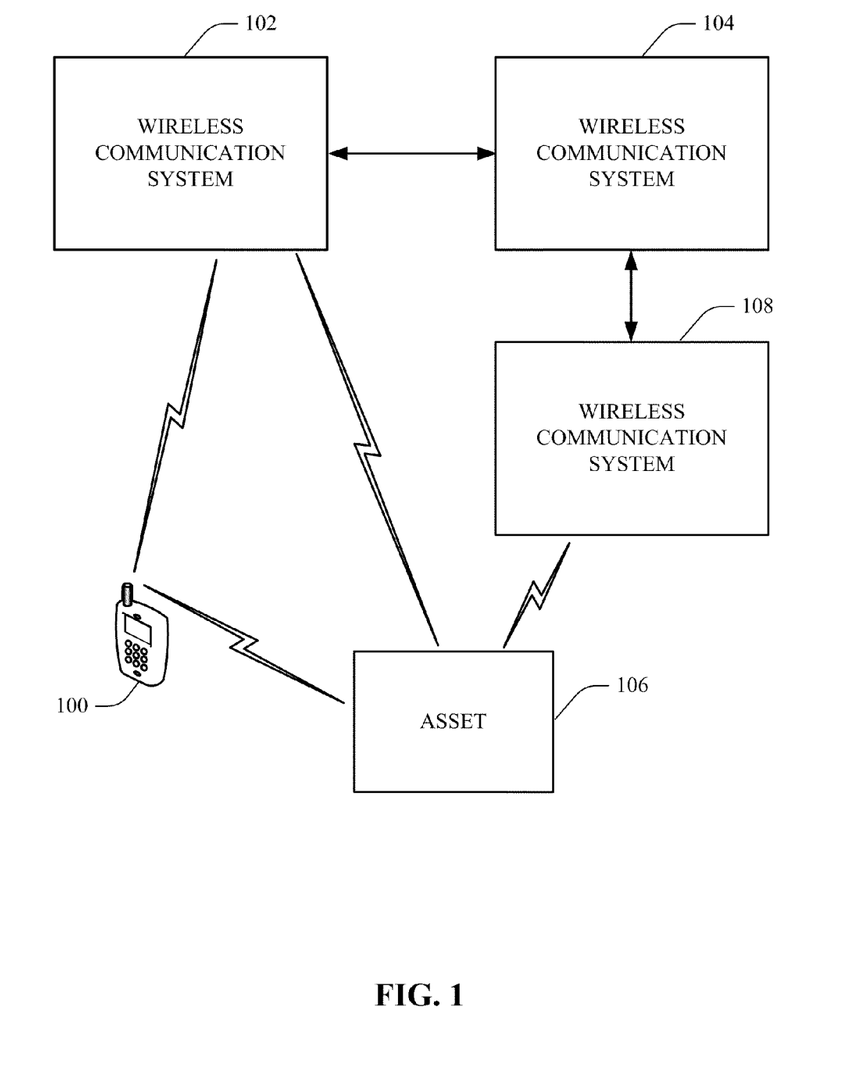
FIG. 1 illustrates a communication system in which the various embodiments described herein are used.

FIG. 1 illustrates a communication system comprising a wireless communication device (WCD) 100, a wireless communication system 102, a central processing facility (CPF) 104, and an asset 106. An individual uses WCD 100 to make asset 106 apparent to the individual, typically by audio or visual means. Generally, the individual enters an identification code corresponding to asset 106 into WCD 100, then WCD 100 transmits a request, including the identification code, to asset 106 either directly or through wireless communication system 102. In one embodiment, the request may be forwarded to CPF 104 before being sent to asset 106, where the request is authenticated and/or otherwise processed. When asset 106 receives the request, it may process the request in a number of different ways, which is discussed in more detail below. Ultimately, asset 106 makes itself apparent to the individual by performing one or more actions, such as by illuminating one or more lights connected to asset 106, by sounding an audible alert, or by moving a mechanical portion, or all of, asset 106.

Figure 2:
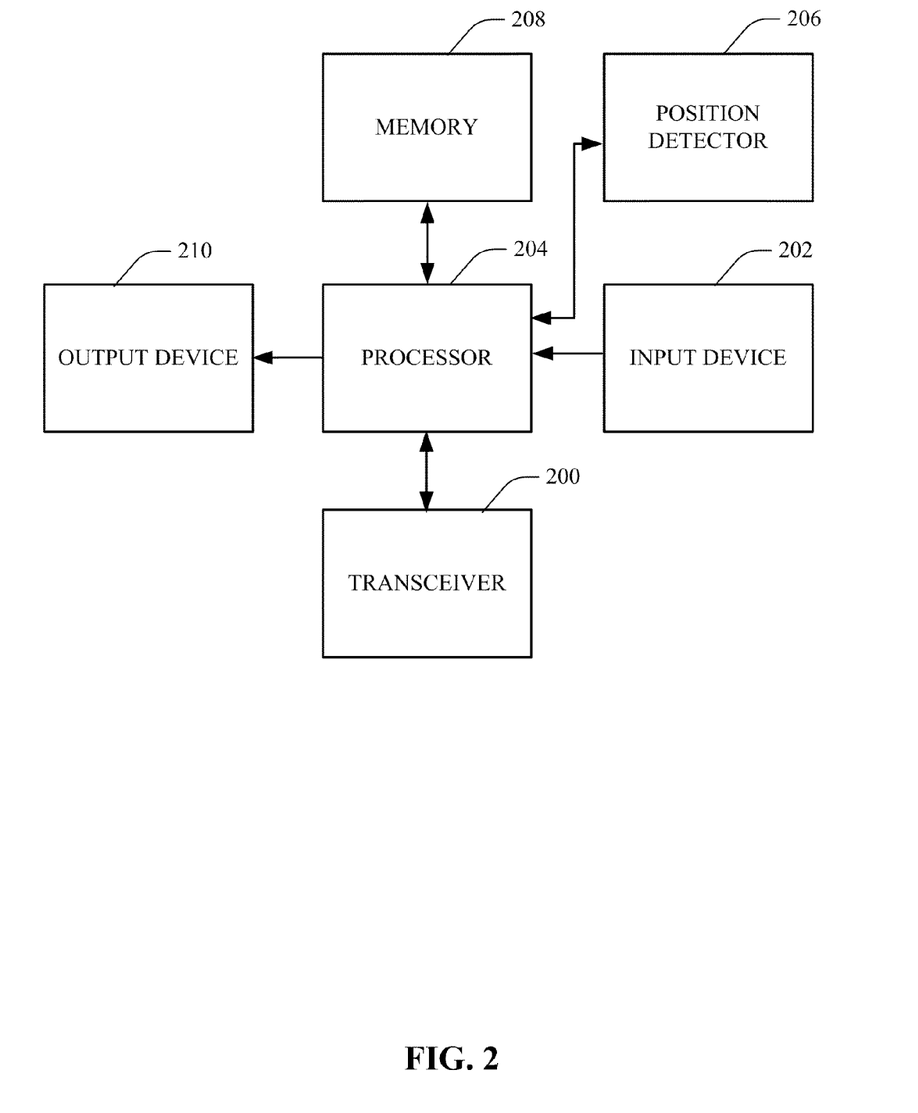
FIG. 2 illustrates a functional block diagram of a wireless communication device used in the communication system of FIG. 1.

In one embodiment, WCD FIG. 2 illustrates a functional block diagram of one embodiment of WCD 100. It should be understood that not all of the elements shown in FIG. 2 are required in every possible embodiment for making asset 106 apparent. It should also be understood that the elements shown in FIG. 2 could reside in virtually any type of wireless device having transmission capabilities, such as a cellular or satellite telephone, a two-way pager, a personal digital assistant (PDA) having wireless capabilities, a portable computer having wireless capabilities, or a device dedicated solely for making asset 106 apparent.

Processor 204 sends and receives information from transceiver 200. Processor 304 typically comprises an electronic digital computing device, such as any of the 80×86 processors from Intel Corporation of Santa Clara, Calif. Processor 308 could alternatively comprise a number of discreet electronic components, a custom ASIC, or other digital processing apparatus known in the art.

Memory 208 comprises one or more electronic memory components, such as ROM, RAM, EEPROM, flash memory, or the like, for storing information pertinent for having asset 106 making itself apparent. For example, memory 208 may store executable computer instructions (i.e., a computer program) for use by processor 204, for transmitting apparency apparent requests and/or for determining which type of appetency action to be taken by asset 106. Memory 208 may be considered a signal-bearing medium tangibly embodying a program of machine-readable instructions executable by a digital processing apparatus (i.e., processor 204) to perform a method for making asset 106 apparent. Such a program may comprise, for example, a program operating within a cell phone environment, such as the popular Binary Run-Time Environment (BREW®) operating system by QUALCOMM or the JAVA run-time environment by Sun Microsystems.

100 communicates directly with asset 106, using one of a number of known wireless communication techniques, such as frequency modulation (FM), amplitude modulation (AM), high speed digital communication techniques under the well-known 802.11 standard (commonly known as Wi-Fi) and other digital communication techniques, Infra-red (IR) communication technology, and others. Transceiver 200 is used to transmit information to asset 106 using one of these techniques.

An individual wishing to make asset 106 apparent generally begins by entering an identification code corresponding to asset 106 into WCD 100 by using input device 202. Input device 202 typically comprises a keypad, microphone, or other input device that is electronically coupled to processor 204. The identification code comprises any alpha-numeric sequence (including numbers only or letters only) which uniquely identifies asset 106, or a group of similar assets to asset 106, such as a serial number of asset 106 or a predetermined alpha-numeric code issued by an entity associated with asset 106 (such as the owner of asset 106 or the individual associated with WCD 100).

Processor 204 receives the identification code and generates a request to make asset 106 apparent. The request, in this embodiment, simply directs asset 106 to take whatever action that is available to asset 106 to make itself apparent. The request is then provided to transceiver 200, where it is transmitted directly to asset 106. The identification code provided by processor 204 is used to uniquely address the particular asset 106 desired by the individual using techniques well-known in the art. The asset 106, upon receipt of the request, makes itself apparent to the requesting individual as discussed later herein.

In another embodiment, the request comprises a command that dictates how asset 106 is to respond to the request to make itself apparent. For example, asset 106 may have the capability to make itself apparent to an individual by sounding a horn and lighting its headlights. The request may then request asset 106 to light its headlights if it is in a dark area. In this embodiment, the individual uses input device 202 to enter his or her preferred method of having asset 106 make itself apparent. The resulting request from processor 204 comprises the individual's preferred method of making asset 106 apparent. In a slight alteration of this embodiment, asset 106 may be able to perform multiple ways of making itself apparent, but if the individual fails to specify a preferred method of appetency, a default appetency method is used. Alternatively, rather than using a default method of appetency, asset 106 determines which of several alternative methods of appetency might get the attention of the requesting individual the best, considering factors such as the types of appetency mechanisms available to asset 106, the amount of light available in the vicinity of asset 106, the distance that the requesting individual is from asset 106 (in this embodiment, WCD 100 comprises a position detector 206, such as a GPS receiver or other circuitry, for determining a location of WCD 100 and the request comprises at the position of WCD 100 (or, alternatively, information that would allow an entity such as CPF 104 or wireless communication system 102 to determine the position of WCD 100), the battery capacity available to become apparent, etc.

In yet another embodiment, WCD 100 negotiates a method for apparatus 106 to make itself apparent. For example, after an individual requests asset 106 to make itself apparent, one of several different actions are taken by WCD 100 and asset 106. In one embodiment, a request is generated by processor 204, instructing asset 106 to make itself apparent. In response to receiving the request, asset 106 may transmit a list of possible actions back to WCD 100 that asset 106 is capable of performing. Processor 204 receives this information, and generally displays it to the individual via output device 210. The individual then chooses which action for asset 106 to take, and indicates his/her selection via input device 202. Processor 204 receives the individual's selection and transmits it to asset 106. Upon receipt of the selection, asset 106 performs the selected action to make itself apparent to the individual.

In another embodiment, the negotiation between WCD 100 and asset 106 comprises the individual first entering a selected action upon requesting that asset 106 make itself apparent. Processor 204 receives the request and the selected action and generates a request which is provided to transceiver 200 and ultimately asset 106. Asset 106 receives the request and the selected action and compares the selected action to a list of possible actions stored in a memory within asset 106. If a match is found, asset 106 performs the requested action. If a match is not found, asset 106 transmits a message back to WCD 100 informing WCD 100 that the selected action is not possible. In this embodiment, asset 106 could additionally provide information indication of what kind of action(s) it is capable of, in order for the individual to select one of these actions. Such actions are received by processor 204 and provided to the individual via output device 210. The individual would then select one of the actions provided by asset 106, which would then be provided to processor 204. Processor 204 then generates a message which is transmitted to asset 106. Asset 106 receives the message comprising the selected action, and performs it accordingly.

WCD 100 may, additionally or alternatively to the methods described above, communicate with asset 106 through in intermediary, such as wireless communication system 102 and/or central processing facility 104. In this embodiment, WCD 100 is likely to comprise a cellular telephone, wireless PDA, two-way pager, or some other device that has functionality other than communicating with asset 106.

In one embodiment, WCD 100 communicates through wireless communication system 102 to asset 106. Wireless communication system 102 comprises virtually any type of wireless communication network, such as a cellular or PCS network, an AMPS network, a satellite communication network, a wireless digital network such as CDPD, a paging network, etc. Any of the embodiments discussed above can be used with this arrangement, i.e., WCD 100 and asset 106 communicating through wireless communication system 102.

In another embodiment, central processing facility 104 is used to authenticate WCD 100 and/or the individual operating WCD 100 and/or to otherwise process appetency requests as well as responses from WCD 106. For instance, in one embodiment, an individual enters an identification code into WCD 100 identifying asset 106 that is to be located. Processor 204 receives the request and the identification code and sends a request to CPF 104 to make asset 106 apparent. The request generally comprises the identification code corresponding to asset 106. CPF 104 receives the request and identification code and may initially authenticate WCD 100 and/or the individual operating WCD 100. This may be accomplished by identifying a particular code corresponding to WCD 100, such as an electronic serial number (ESN) or mobile identification number (MIN), or it may be accomplished by examining a code supplied by the requesting individual, such as a username and password, a social security number, or other alpha-numeric code which gives the individual permission to make asset appetency requests, and comparing the code to a list of permissible codes stored at CPF 104. If a match is found, the request from WCD 100 is allowed to progress. If a match is not found, CPF 104 may transmit a message to WCD 100 informing the individual that the request failed.

Alternatively, or in addition, to the authentication process just described, CPF 104 may provide a centralized location to process requests from WCD 100 and responses from asset 106. For example, CPF 104 typically comprises a database which stores information pertinent to a large number of assets 106, including similar and dissimilar assets. The types of information stored in the database can include such things as the location of each asset or the last known location of each asset, an asset capability or capabilities for becoming apparent, a present condition of an asset (for example, battery low, battery fully charged, ignition on or off, etc), an identification code corresponding to each asset, an authorization code for each asset, a present rental condition of the asset (i.e., currently rented or not currently rented), or contact information for the owner, renter, or other entity associated with the asset. Of course, other types of information associated with each asset could be stored as well.

When a request to make asset 106 become apparent is received by CPF 104, an authentication process may take place as described above. If the authentication is successful, the request may, in one embodiment, simply be forwarded to asset 106, either through wireless communication system 102 or through an alternate communication system 108, such as any of the communication methods described above with respect to wireless communication system 102. Asset 106 may initiate a predefined action, such as illuminating one or more lights associated with asset 106. In another embodiment, asset 106 and WCD 100 negotiate which type of action to take to make asset 106 apparent to the requesting individual. Communications between asset 106 and WCD 100 in this embodiment may occur directly through wireless communication system 102 or the communications may be routed through CPF 104.

In an embodiment where the request from WCD 100 comprises a selected appetency action, the selected action may be compared to actions that asset 106 is capable of performing. Such capability or capabilities may be stored in the database associated with CPF 104. If asset 106 is capable of performing the selected action, a message is transmitted to asset 106 requesting that asset 106 initiate the selected action. The message may be routed through wireless communication system 102 or through alternative communication system 108. If asset 106 is not able to perform the requested appetency action, a message may be transmitted back to WCD 100, informing it of this information. The individual associated with WCD 100 may then attempt to have asset 106 make itself apparent by selecting a different appetency action, and transmitting this second request to CPF 104. The second selected appetency action is again compared to the information in the database to determine if asset 106 is able to perform the second selected action, and so on.

Figure 3:
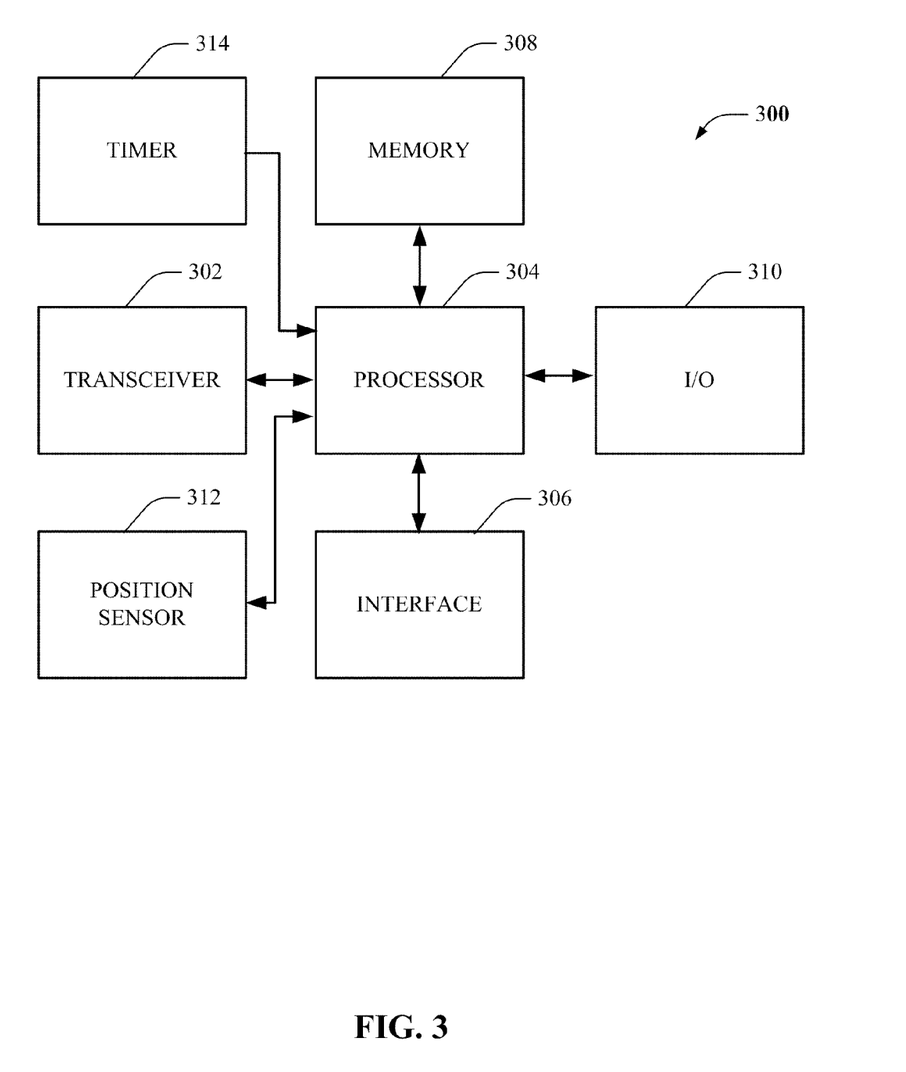
FIG. 3 illustrates a functional block diagram of an apparatus for making an asset apparent.

FIG. 3 illustrates a functional block diagram of an apparatus 300 for making a an asset 106 apparent. Apparatus 300 is typically installed onto an asset for making the asset apparent when requested to do so. For example, apparatus 300 may be installed onto a vehicle, a cargo container, a piece of rental equipment or construction equipment, and so on.

Apparatus 300 comprises at least transceiver 302, processor 304, interface 306 and memory 308. Optionally, input/output (I/O) 310 is included as well. Transceiver 302 is used to receive appetency requests and for transmitting information to a requesting WCD 100. Transceiver 302 may comprise any type of wireless communication transceiver, such as RF, cellular, satellite, digital, or other wireless communication device. The term "transceiver", as used herein, refers generally to both a transmitter and a receiver.

Processor 304 sends and receives information from transceiver 302. Processor 304 typically comprises an electronic digital computing device, such as any of the 80×86 processors from Intel Corporation of Santa Clara, Calif. Processor 308 could alternatively comprise a number of discreet electronic components, a custom ASIC, or other digital processing apparatus known in the art.

Memory 308 comprises one or more electronic memory components, such as ROM, RAM, EEPROM, flash memory, or the like, for storing information pertinent for having asset 106 making itself apparent. For example, memory 308 may store executable computer instructions (i.e., a computer program) for use by processor 304, for responding to appetency requests from WCD 100 and for initiating one or more appetency actions based on received requests.

Interface 306 comprises an electronic pathway, or port, for sending and receiving information to and from asset 106. For example, interface 306 could comprise an RS-232 or similar serial port, a connector, an RF, infra-red, BlueTooth, or WI-FI transceiver, or simply wiring that is connected to various electronic signal sources located on or within asset 106. Interface 306 routes electronic control signals from processor 304 to one or more devices as part of asset 106, such as electronic control circuitry that controls pumps, motors, lights, audio equipment (such as a horn), and other attention-getting devices as part of asset 106.

I/O 310 generally comprises a keypad and display for allowing an individual to enter information into asset 300 and for information to be displayed to an individual. However, I/O 310 could alternatively comprise a communication port for receiving a portable computer from an individual wishing to communicate with asset 106.

In one embodiment, transceiver 302 receives an message directly from WCD 100, requesting that asset 106 make itself apparent. In this embodiment, transceiver 302 receives an appetency request and provides the request to processor 304. In one embodiment, processor 304 determines what type of appetency action to perform. For example, if asset 106 is capable of performing multiple appetency actions, such as illuminating one or more lights or sounding an audible alert, processor 304 decides which of these two appetency actions to implement. In an embodiment where WCD 100 provides its location along with the appetency request, processor 304 may determine how far away WCD 100 is from asset 106 using position sensor 312. Position sensor 312 typically comprises a GPS receiver, or the like, for determining a location of asset 106. Processor 304 compares the location of WCD 100 to the location of asset 106, and determines a relative distance between the two. If the relative distance is less than a predetermined distance, processor 304 may send a command through interface 306 instructing asset 106 to sound an audible alert, such as sounding a horn located on asset 106. If the relative distance between WCD 100 and asset 106 is greater than the predetermined distance, then processor 304 may alternatively send a command through interface 306 to illuminate one or more lights located on asset 106.

In another example, processor 304 may determine the time of day to determine which appetency action to perform. Processor 304 may determine the current time by receiving information from a discreet timer, such as timer 314, from a timing signal provided by position sensor 312, or by any other means known in the art. If processor 304 determines that the current time coincides with daylight hours, for example if the current time is between 7 am and 5 pm, processor 304 may choose to sound an audible alert, rather than illuminating lights, to make asset 106 apparent. Similarly, if the current time falls within night time hours, processor 304 may choose to illuminate one or more lights, rather than sound an audible alert, for making asset 106 apparent.

Processor 304 may take other factors into consideration for choosing which appetency action to perform. For example, processor 304 may receive information pertaining to asset 106 through interface 306, such as a condition of an on-board battery (i.e., fully charged, low charge, etc), the position of a mechanical feature of asset 106 (such as the position of a bulldozer blade, a position of a fork belonging to a forklift, etc), and other types of input. If, for example, the battery condition is low, processor 304 may choose to make asset 106 apparent using the least amount of energy possible. The most energy efficient method of making asset 106 apparent could be predetermined and stored within memory 308.

Finally, processor 304 may decide which method of asset appetency to perform based on a combination of the just-discussed possibilities.

In another embodiment, rather than unilaterally deciding which appetency action to perform, processor 304 may transmit a list of potential appetency actions back to WCD 100 upon receipt of an appetency request. The individual associated with WCD 100 would then choose which action is desired to make asset 106 apparent. The individual enters the selected action into WCD 100 using input device 202, then processor 204 generates a message which includes the selected appetency action. The message is then transmitted directly to WCD 100 using transceiver 200. Apparatus 300 receives the message via transceiver 302 and provides the message to processor 304. Processor 304 then sends a command through interface 306, instructing asset 106 to perform the selected appetency action.

The above embodiments may be accomplished by indirect communication with WCD 100, rather than communicating directly with WCD 100. For example, communications between WCD 100 and apparatus 306 could be accomplished by using wireless communication system 102, alternative communication system 108, or a combination of these or other communication systems.

After asset 106 makes itself apparent, the requesting individual will presumably find the asset. In this case, the individual may use I/O 310 to inform apparatus 300 that the requesting individual has located asset 106. This may be accomplished by the individual entering a predetermined code, such as the identification code corresponding to asset 106, or more simply by, for example, pressing any key of a keypad comprising I/O 310. In another embodiment, interface 306 is connected to a device located as part of asset 106, such as an ignition switch, motion detector, position sensor 312, or some other device which signifies that the asset is being operated, presumably by the individual, and therefore that the individual has located asset 106.

Whether the individual explicitly informs apparatus 300 of a successful asset location by using I/O device 310 or implicitly by operating asset 106, processor 304 receives this information and, in one embodiment, cancels the appetency action by sending a command through interface 306, instructing asset 106 to discontinue the appetency action. In another embodiment, processor 304, alternatively or in addition to canceling the appetency, generates a message for transmission to CPF 104, informing CPF 104 that the requesting individual has located asset 106. CPF 104 may then update its database to reflect the date, time, location, and an identification of WCD 100 and/or the requesting individual (or an identification code associated with the requesting individual), or a combination of these items.

If the requesting individual does not locate asset 106 within a predetermined amount of time, various actions may be taken. The predetermined amount of time is generally related to a reasonable amount of time for an individual to locate asset 106 from the time that the individual requests asset 106 to make itself apparent, although the time period could be based on other things. The elapsed time from when the individual requested that asset 106 make itself apparent may be measured by WCD 100, CPF 104, or by apparatus 300. This elapsed time is compared to the predetermined amount of time to determine if the predetermined amount of time has been exceeded.

If the elapsed time is measured by WCD 100, an indication that the individual has located asset 106 may be received by transceiver 200 (as explained above) or it may be indicated by the individual entering a code or other indication into WCD 100 using input device 202. Receipt of such a signal stops the elapsed time from incrementing and generally means that the predetermined amount of time has not been exceeded. In an embodiment where the individual informs WCD 100 that he or she has located asset 106 by using input device 202, processor 204 generates a message indicating that this has occurred. The message is then transmitted to apparatus 300. If the elapsed time exceeds the predetermined amount of time without an indication that the individual has located asset 106, a message is generated by processor 204 and transmitted to apparatus 300.

If the elapsed time is measured by CPF 104, a signal from apparatus 300 or WCD 100 is received to indicate that the individual has located asset 106, if that is the case. Again, receipt of such a signal stops the elapsed time from incrementing and generally means that the predetermined amount of time has not been exceeded. CPF 104 then updates its database to reflect that this has occurred. If the elapsed time exceeds the predetermined amount of time without an indication that the individual has located asset 106, a message is generated by CPF 104 and transmitted to apparatus 300, informing asset 300 that the elapsed time has exceeded the predetermined amount of time, indicating that the individual has not yet located asset 106.

If the elapsed time is measured by apparatus 300, a signal from WCD 100, CPF 104, or directly though I/O 310 or interface 306 is received to indicate that the individual has located asset 106, if that is the case. Once again, receipt of such a signal stops the elapsed time from incrementing and generally means that the predetermined amount of time has not been exceeded. If the elapsed time exceeds the predetermined amount of time without an indication that the individual has located asset 106, processor 304 may take one or more actions, as explained below.

If apparatus 300 receives a signal or message indicated that the individual has not located asset 106 by the time the predetermined amount of time has expired, processor 304 may initiate a second appetency action different than the original appetency action. Alternatively, or in addition, processor 304 may generate a message for transmission to CPF 104 indicating that the individual has not located asset 106, and may further send a command through interface 306 which cancels the original appetency action. It should be understood that the original action may be cancelled while the second appetency action is in progress.

Figure 4:
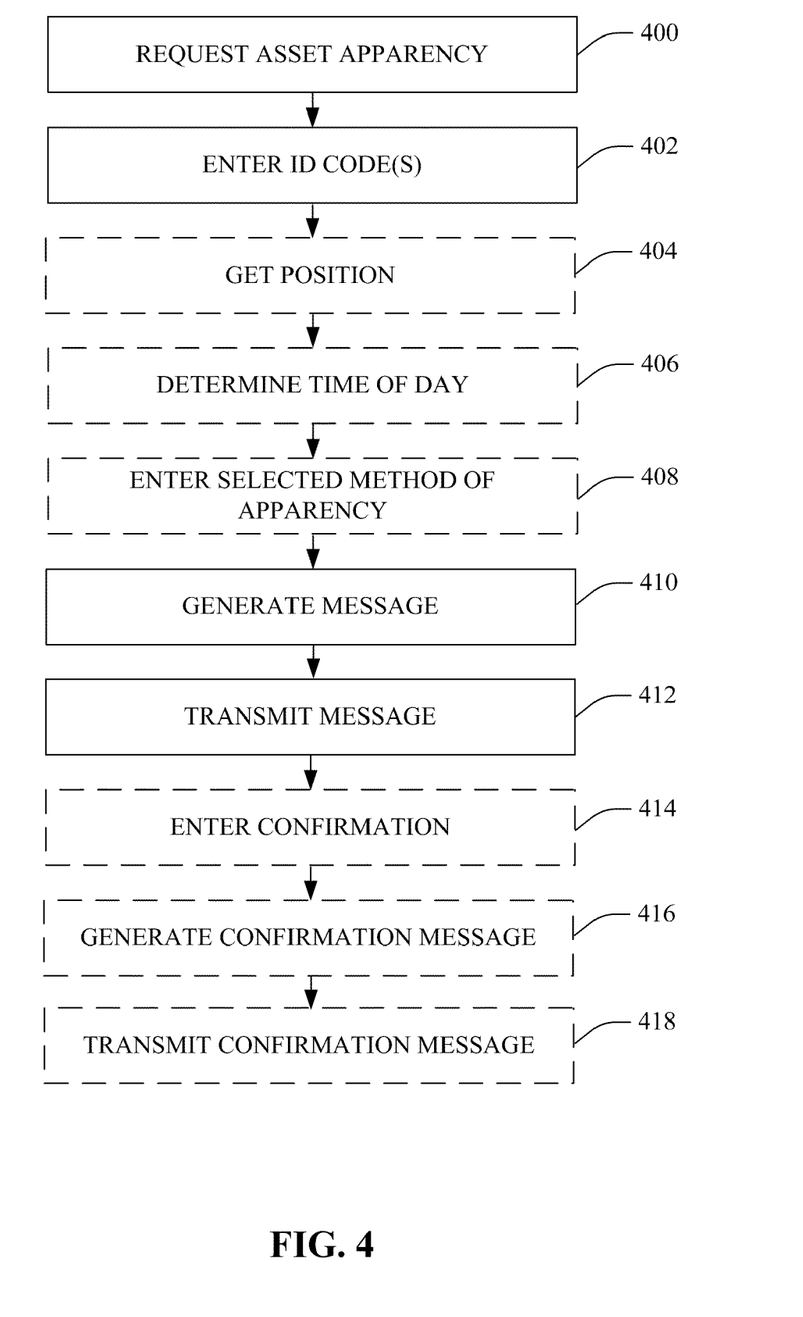
FIG. 4 is a flow diagram illustrating one embodiment of a method for making an asset apparent using the wireless communication device of FIG. 2.

FIG. 4 is a flow diagram illustrating one embodiment of a method for making an asset apparent, using WCD 100. This flow diagram also comprises optional steps that are used in alternative embodiments. These optional steps are shown as dashed lines in FIG. 4.

In step 400, a user of WCD 100 enters a request into WCD 100 to make asset 106 apparent. This request is generally followed by the step of entering an identification code corresponding to asset 106 into WCD 100, shown as step 402.

In step 404, WCD 100 optionally determines its position for embodiments where the position of WCD 100 is used to determine the type of appetency action to be taken, or in embodiments where the location of WCD 100 is recorded for informational purposes.

In step 406, WCD 100 optionally determines the current time of day. The time of day is used in embodiments where WCD 100 determines which type of appetency action asset 106 should perform based on whether the current time indicates daylight or darkness.

In step 408, the individual operating WCD 100 optionally enters a selected method of asset appetency into WCD 100. This step is performed in embodiments where the individual determines which type of action for asset 106 to take, or it is performed in embodiments where the appetency action is negotiated between asset 106 and WCD 100.

In step 410, processor 204 generates a request to make asset 106 apparent. The request may comprise an instruction to make asset 106 apparent, the identification code supplied in step 402, the current location of WCD 100 as determined in step 404, the current time of day as determined in step 406, a selected method of asset appetency as determined in step 408, or any combination of the aforementioned items.

In step 412, the request to make asset 106 apparent is transmitted, either directly to asset 106, through wireless communication system 102, through CPF 104, through alternative communication system 108, or a combination of these paths.

In response to receiving the request to make asset 106 apparent, apparatus 300 initiates one or more commands to asset 106 to make asset 106 apparent to the requesting individual. In one embodiment, once the individual has located asset 106, a confirmation of such finding is entered directly into WCD 100, as shown in step 414. In response to receiving the confirmation, processor 204 generates a confirmation message, as shown in step 416. The confirmation message generally alerts interested parties, such as asset 106, CPF 104, or other entities, that the individual has located asset 106. In step 418, the confirmation message is transmitted to the interested parties.

Figure 5:
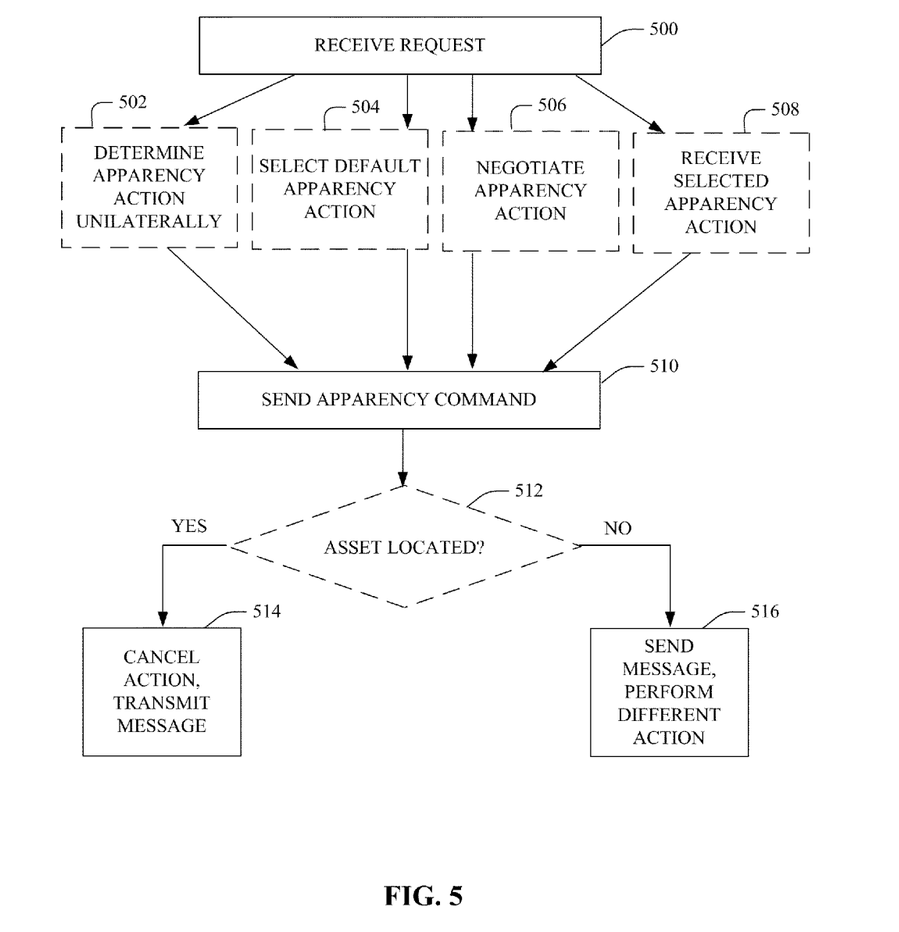
FIG. 5 is a flow diagram illustrating one embodiment of a method for making an asset apparatus using the apparatus of FIG. 3.

FIG. 5 is a flow diagram illustrating one embodiment of a method for making asset 106 apparent, using apparatus 300. This flow diagram also comprises optional steps that are used in alternative embodiments. These optional steps are shown as dashed lines in FIG. 5.

In step 500, apparatus 300 receives a request to make asset 106 apparent, either directly from WCD 100, through wireless communication system 102, through CPF 104, through alternative communication system 108, or a combination of these paths.

In step 502, processor 304 unilaterally determines which type of appetency action to perform, in an embodiment where the appetency request does not specify which type of appetency action to perform. Processor 304 may use the current time of day, a location of WCD 100, a location of asset 106, a condition of one or more parameters of asset 106 (such as battery charge, the position of one or more mechanical features of asset 106, etc.), or a combination of these factors in determining which type of appetency action to perform.

In step 504, processor 304 determines which type of appetency action to perform, in an embodiment where the appetency request does not specify which type of appetency action to perform and where asset 106 is only capable of performing a single type of appetency action. For example, asset 106 may only have external lights, and no other means for making itself apparent to a requesting individual.

In step 506, a negotiation is performed between apparatus 300 and either WCD 100, or CPF 104, as the case may be, in embodiments where a negotiated appetency action is possible. The negotiation process is described in detail above.

In step 508, processor 304 receives a selected appetency action in the appetency request, in an embodiment where the requesting individual chooses a selected appetency action for asset 106 to perform.

Regardless of which embodiment is used to select the appetency action(s), in step 510, processor 304 sends a command through interface 306, instructing asset 106 to perform the selected appetency action(s).

In step 512, processor 304 optionally determines whether the requesting individual has located asset 106 within a predetermined amount of time. If the requesting individual has located asset 106 within the predetermined amount of time, one or more actions may be taken by apparatus 300, such as canceling the appetency action(s), transmitting a message to CPF 104 indicating a successful location, or transmitting a similar message to WCD 100. This is shown as step 514.

If the requesting individual has not located asset 106 within the predetermined amount of time, apparatus 300 may take one or more actions, such as sending a message to WCD 100 asking it to re-confirm the original request for asset appetency, sending a message to CPF 104 informing it that the requesting individual has not located asset 106, or instructing asset 106 to perform a second type of appetency action.

The previous description of the preferred embodiments is provided to enable any person skilled in the art to make and use the present invention. The various modifications to these embodiments will be readily apparent to those skilled in the art, and the generic principles defined herein may be applied to other embodiments without the use of the inventive faculty. Thus, the present invention is not intended to be limited to the embodiments discussed herein, but is to be accorded the widest scope consistent with the principles and novel features disclosed herein.

What is claimed is:

1. A method for making an asset apparent, the method comprising:
    obtaining, from a user, an asset apparency request to locate an asset, wherein the asset apparency request includes an identification code corresponding to the asset;
    generating an asset apparency message, wherein the asset apparency message includes an identification code corresponding to the user, the identification code corresponding to the asset, and one or more instructions to trigger the asset to perform one or more functionalities to make the asset apparent; and
    transmitting, to a central processing facility, the asset apparency message, wherein the asset apparency message is processed by the central processing facility by:
        determining a unique identifying value for the asset from the identification codes corresponding to the user and the asset; and
        transmitting the one or more instructions to trigger the asset to perform one or more functionalities to make the asset, identified by the unique identifying value, apparent.

2. The method of claim 1, wherein the obtaining further comprises:
    receiving the asset apparency request from at least one of: a user selection to a wireless communications device, or from a wireless communications system, or from a central processing facility.

3. The method of claim 1, wherein the identification code corresponding to the asset includes at least one of: an electronic serial number, or a mobile identification number, or a username and password, or an alpha-numeric code.

4. The method of claim 1, wherein the identification code corresponding to the user includes at least one of: a code supplied by a requesting user, or a username and password, or a social security number, or an alpha-numeric code.

5. The method of claim 1, wherein the one or more functionalities includes at least one of: illuminating the asset, or performing an audio alert by the asset or performing a mechanical movement by the asset.

6. The method of claim 1, wherein the one or more functionalities for the asset depends on a battery power value for the asset.

7. The method of claim 1, wherein the asset apparency message further includes a location value for a wireless communications device transmitting the asset apparency message; and
    wherein the one or more functionalities for the asset depends on the location value for the wireless communications device.

8. The method of claim 1, wherein the transmitting further comprises transmitting using a network, wherein the network comprises at least one of: a cellular network, an AMPS network, a satellite communication network, a wireless digital network, or a paging network.

9. The method of claim 1, wherein the asset includes at least one of: a cellular telephone, or a satellite telephone, or a two-way pager, or a personal digital assistant, or a portable computer, or an asset finding device.

10. At least one processor configured for making an asset apparent:
    a first module for obtaining, from a user, an asset apparency request to locate an asset, wherein the asset apparency request includes an identification code corresponding to the asset;
    a second module for generating an asset apparency message, wherein the asset apparency message includes an identification code corresponding to the user, the identification code corresponding to the asset, and one or more instructions to trigger the asset to perform one or more functionalities to make the asset apparent; and
    a third module for transmitting, to a central processing facility, the asset apparency message, wherein the asset apparency message is processed by the central processing facility by:
        determining a unique identifying value for the asset from the identification codes corresponding to the user and the asset; and
        transmitting the one or more instructions to trigger the asset to perform one or more functionalities to make the asset, identified by the unique identifying value, apparent.

11. A non-transitory computer-readable storage medium comprising:
    a first set of codes for causing a computer to obtain, from a user, an asset apparency request to locate an asset, wherein the asset apparency request includes an identification code corresponding to the asset;
    a second set of codes for causing the computer to generate an asset apparency message, wherein the asset apparency message includes an identification code corresponding to the user, the identification code corresponding to the asset, and one or more instructions to trigger the asset to perform one or more functionalities to make the asset apparent; and
    a third set of code for causing the computer to transmit, to a central processing facility, the asset apparency message, wherein the asset apparency message is processed by the central processing facility by:
        determining a unique identifying value for the asset from the identification codes corresponding to the user and the asset; and
        transmitting the one or more instructions to trigger the asset to perform one or more functionalities to make the asset, identified by the unique identifying value, apparent.

12. An apparatus, comprising:
- means for obtaining, from a user, an asset apparency request to locate an asset, wherein the asset apparency request includes an identification code corresponding to the asset;
- means for generating an asset apparency message, wherein the asset apparency message includes an identification code corresponding to the user, the identification code corresponding to the asset, and one or more instructions to trigger the asset to perform one or more functionalities to make the asset apparent; and
- means for transmitting, to a central processing facility, the asset apparency message, wherein the asset apparency message is processed by the central processing facility by:
  - means for determining a unique identifying value for the asset from the identification codes corresponding to the user and the asset; and
  - means for transmitting the one or more instructions to trigger the asset to perform one or more functionalities to make the asset, identified by the unique identifying value, apparent.

13. An apparatus for making an asset apparent, the apparatus comprising:
- an asset apparency module for:
  - obtaining, from a user, an asset apparency request to locate an asset, wherein the asset apparency request includes an identification code corresponding to the asset; and
  - generating an asset apparency message, wherein the asset apparency message includes an identification code corresponding to the user, the identification code corresponding to the asset, and one or more instructions to trigger the asset to perform one or more functionalities to make the asset apparent; and
- a transmitter for:
  - transmitting, to a central processing facility, the asset apparency message, wherein the asset apparency message is processed by the central processing facility by:
    - determining a unique identifying value for the asset from the identification codes corresponding to the user and the asset; and
    - transmitting the one or more instructions to trigger the asset to perform one or more functionalities to make the asset, identified by the unique identifying value, apparent.

14. The apparatus of claim 13, further comprising:
- a receiver for receiving the asset apparency request from at least one of: a user selection to the wireless communications device, or a wireless communications system, or a central processing facility.

15. The apparatus of claim 13, wherein the identification code corresponding to the asset includes at least one of: an electronic serial number, or a mobile identification number, or a username and password, or an alpha-numeric code.

16. The apparatus of claim 13, wherein the identification code corresponding to the user includes at least one of: a code supplied by a requesting user, or a username and password, or a social security number, or an alpha-numeric code.

17. The apparatus of claim 13, wherein the one or more functionalities includes at least one of: illuminating the asset, or performing an audio alert by the asset or performing a mechanical movement by the asset.

18. The apparatus of claim 13, wherein the one or more functionalities for the asset depends on a battery power value for the asset.

19. The apparatus of claim 13, wherein the asset apparency message further includes a location value for a wireless communications device transmitting the asset apparency message; and
- wherein the one or more functionalities for the asset depends on the location value for the wireless communications device.

20. The apparatus of claim 13, wherein the transmitter is further operable for:
- transmitting using a network, wherein the network comprises at least one of: a cellular network, an AMPS network, a satellite communication network, a wireless digital network, or a paging network.

21. The apparatus of claim 13, wherein the apparatus comprising at least one of:
- a cellular telephone, a satellite telephone, a two-way pager, a personal digital assistant, a portable computer, or an asset finding device.

22. A method for making an asset apparent, the method comprising:
- receiving an asset apparency message, wherein the asset apparency message includes an identification code corresponding to the user, the identification code corresponding to the asset, and one or more instructions to trigger the asset to perform one or more functionalities to make the asset apparent;
- determining a unique identifying value for the asset from the identification codes corresponding to the user and the asset;
- selecting at least one of the one or more functionalities to make the asset apparent; and
- transmitting the one or more instructions to trigger the asset to perform one or more functionalities to make the asset, identified by the unique identifying value, apparent.

23. The method of claim 22, wherein the identification code corresponding to the asset includes at least one of: an electronic serial number, or a mobile identification number, or a username and password, or an alpha-numeric code.

24. The method of claim 22, wherein the identification code corresponding to the user includes at least one of: a code supplied by a requesting user, or a username and password, or a social security number, or an alpha-numeric code.

25. The method of claim 22, wherein the one or more functionalities include at least one of: illuminating the asset, or performing an audio alert by the asset, or performing a mechanical movement by the asset.

26. The method of claim 22, wherein the selecting further includes selecting the at least one of the one or more functionalities for the asset depending on a battery power value for the asset.

27. The method of claim 22, wherein the asset apparency message further includes a location value for a wireless communications device transmitting the asset apparency message;
- further comprising determining a location value for the asset; and
- wherein the selecting further includes selecting the at least one of the one or more functionalities for the asset depending on the distance between location value for the wireless communications device and the location value for the asset.

28. The method of claim 22, wherein the receiving further comprises:

receiving using a network, wherein the network comprises at least one of: a cellular network, an AMPS network, a satellite communication network, a wireless digital network, or a paging network.

29. The method of claim 22, further comprising: determining the asset has been located.

30. The method of claim 29, wherein the determining includes at least one of:
monitoring a motion detector on the asset, or
monitoring an input interface of the asset for an input indicating the asset has been located, or
monitoring a position sensor on the asset.

31. At least one processor configured for making an asset apparent:
a first module for receiving, wherein the asset apparency message includes an identification code corresponding to the user, the identification code corresponding to the asset, and one or more instructions to trigger the asset to perform one or more functionalities to make the asset apparent;
a second module for determining a unique identifying value for the asset from the identification codes corresponding to the user and the asset;
a third module for selecting at least one of the one or more functionalities to make the asset apparent; and
a fourth module for transmitting the one or more instructions to trigger the asset to perform one or more functionalities to make the asset, identified by the unique identifying value, apparent.

32. A non-transitory computer-readable storage medium comprising:
a first set of codes for causing a computer to receive an asset apparency message, wherein the asset apparency message includes an identification code corresponding to the user, the identification code corresponding to the asset, and one or more instructions to trigger the asset to perform one or more functionalities to make the asset apparent;
a second set of codes for causing the computer to determine a unique identifying value for the asset from the identification codes corresponding to the user and the asset;
a third set of codes for causing the computer to select at least one of the one or more functionalities to make the asset apparent; and
a fourth set of codes for causing the computer to transmit the one or more instructions to trigger the asset to perform one or more functionalities to make the asset, identified by the unique identifying value, apparent.

33. An apparatus, comprising:
means for receiving an asset apparency message, wherein the asset apparency message includes an identification code corresponding to the user, the identification code corresponding to the asset, and one or more instructions to trigger the asset to perform one or more functionalities to make the asset apparent;
means for determining a unique identifying value for the asset from the identification codes corresponding to the user and the asset;
means for selecting at least one of the one or more functionalities to make the asset apparent; and
means for transmitting the one or more instructions to trigger the asset to perform one or more functionalities to make the asset, identified by the unique identifying value, apparent.

34. An apparatus for making an asset apparent, the apparatus comprising:
a receiver for:
receiving an asset apparency message, wherein the asset apparency message includes an identification code corresponding to the user, the identification code corresponding to the asset, and one or more instructions to trigger the asset to perform one or more functionalities to make the asset apparent;
an asset apparency module for:
determining a unique identifying value for the asset from the identification codes corresponding to the user and the asset selecting at least one of the one or more functionalities to make the asset apparent; and
a transmitter for:
transmitting the one or more instructions to trigger the asset to perform one or more functionalities to make the asset, identified by the unique identifying value, apparent.

35. The apparatus of claim 34, wherein the identification code corresponding to the asset includes at least one of: an electronic serial number, or a mobile identification number, or a username and password, or an alpha-numeric code.

36. The apparatus of claim 34, wherein the identification code corresponding to the user includes at least one of: a code supplied by a requesting user, or a username and password, or a social security number, or an alpha-numeric code.

37. The apparatus of claim 34, wherein the one or more functionalities include at least one of: illuminating the asset, or performing an audio alert by the asset, or performing a mechanical movement by the asset.

38. The apparatus of claim 34, wherein the asset apparency module is further operable for selecting the at least one of the one or more functionalities for the asset depending on a battery power value for the asset.

39. The apparatus of claim 34, wherein the asset apparency message further includes a location value for a wireless communications device transmitting the asset apparency message; and
wherein the asset apparency module is further operable for:
determining a location value for the asset; and
selecting the at least one of the one or more functionalities for the asset depending on the distance between location value for the wireless communications device and the location value for the asset.

40. The apparatus of claim 34, wherein the receiver is further operable for:
receiving using a network, wherein the network comprises at least one of: a cellular network, an AMPS network, a satellite communication network, a wireless digital network, or a paging network.

41. The apparatus of claim 34, wherein the asset apparency module is further operable for: determining the asset has been located.

42. The apparatus of claim 41, wherein the asset apparency module is further operable for at least one of:
monitoring a motion detector on the asset to determine if the asset has been located, or
monitoring an input interface of the asset for an input indicating the asset has been located, or
monitoring a position sensor on the asset to determine if the asset has been located.

43. The apparatus of claim 34, wherein the asset comprising at least one of:
a cellular telephone, a satellite telephone, a two-way pager, a personal digital assistant, and a portable computer.

* * * * *